United States Patent [19]
Lee et al.

[11] Patent Number: 6,088,522
[45] Date of Patent: Jul. 11, 2000

[54] COMPUTER-IMPLEMENTED INBUILDING PREDICTION MODELING FOR CELLULAR TELEPHONE SYSTEMS

[75] Inventors: William Chien-Yeh Lee, Danville; Jau Young Lee, Walnut Creek, both of Calif.

[73] Assignee: AirTouch Communications, Inc., San Francisco, Calif.

[21] Appl. No.: 08/904,309

[22] Filed: Jul. 31, 1997

[51] Int. Cl.[7] .................................................. G06F 9/455
[52] U.S. Cl. ......................................................... 395/500.34
[58] Field of Search ........................... 364/578; 395/500, 395/500.23, 500.34, 500.41, 500.42; 375/224; 455/63, 454; 370/338, 349

[56] References Cited

U.S. PATENT DOCUMENTS

| | | |
|---|---|---|
| 3,806,809 | 4/1974 | Firman . |
| 4,317,214 | 2/1982 | Attinello . |
| 4,613,990 | 9/1986 | Halpern . |
| 4,679,248 | 7/1987 | McKeown . |
| 4,704,734 | 11/1987 | Menich et al. . |
| 5,019,961 | 5/1991 | Addesso et al. . |
| 5,144,642 | 9/1992 | Weinberg et al. . |
| 5,233,628 | 8/1993 | Rappaport et al. ..................... 375/224 |
| 5,410,737 | 4/1995 | Jones ...................................... 455/454 |
| 5,574,979 | 11/1996 | West .......................................... 455/63 |
| 5,657,317 | 8/1997 | Mahany et al. ......................... 370/338 |
| 5,726,984 | 3/1998 | Kubler et al. ........................... 370/349 |

*Primary Examiner*—Kevin J. Teska
*Assistant Examiner*—Dan Fiul
*Attorney, Agent, or Firm*—Gates & Cooper

[57] ABSTRACT

A computer-implemented modeling tool for cellular telephone systems predicts signal strength under real conditions within a building, by considering the effects of inter-building and intra-building structures on transmitted signals. The modeling tool gives more accurate predictions under line of sight conditions, when obstructions occur due to inter-building and intra-building structures.

18 Claims, 7 Drawing Sheets

6,088,522

COMPUTER-IMPLEMENTED INBUILDING PREDICTION MODELING FOR CELLULAR TELEPHONE SYSTEMS

CROSS-REFERENCE TO RELATED APPLICATIONS

This application is related to U.S. patent application Ser. No. 08/904,410, filed on same date herewith, by William C. Y. Lee, et al., and entitled "COMPUTER-IMPLEMENTED MICROCELL PREDICTION MODELING WITH TERRAIN ENHANCEMENT," which application is incorporated by reference herein.

BACKGROUND OF THE INVENTION

1. Field of the Invention

The present invention relates to a computer-implemented system for the design and development of cellular telephone systems or other wireless communication systems. In particular, the present invention discloses a modeling system integrated with a comprehensive set of software tools for the design, development and management of cellular telephone systems.

2. Description of Related Art

The capacity of cellular telephone systems in urban areas is typically its most precious commodity. The use of smaller cells, called "microcells," has been one of the solutions used to increase the capacity of cellular telephone systems.

Because capacity is such a precious commodity, the design and management decisions made for cellular telephone systems are usually made to maximize the capacity of the system. For example, engineers must design the system to maximize the coverage of the geographic area with the minimum number of cell sites. In addition, interference problems must be studied so that their effect is minimized. Further, the blocking probability of each cell site must be analyzed to ensure proper call initiation.

The design of a cellular telephone system or other wireless communications system is typically performed using modeling techniques before the system is placed in actual usage. The Lee model, described in "Mobile Cellular Telecommunications," by William C. Y. Lee, Second Edition, 1995, which is incorporated by reference herein, is the standard model for designing a cellular telephone system. The models and the investigations performed in this area concentrate on analyzing the propagation of electromagnetic waves under a line of sight analysis.

However, calls that are generated from within buildings or that are directed toward cellular phones within buildings are generally not taken into account by system designers. The reflections or blocking of a direct line of sight transmission due to exterior and interior building walls are typically ignored or averaged out during the modeling process. Ignoring or averaging these effects on the transmission of cellular signals was assumed to be proper since cells are small. However, microcell antennas, once placed in operation, need to be adjusted in terms of placement, power output, and antenna beam patterns because the models used do not accurately predict the conditions experienced in actual use of the cellular telephone system.

It can be seen, then, that there is a need for a better modeling tool to more accurately predict conditions present when the cellular telephone system is placed in operation.

SUMMARY OF THE INVENTION

To minimize the limitations in the prior art described above, and to minimize other limitations that will become apparent upon reading and understanding the present specification, the present invention discloses a method, apparatus, and article of manufacture for modeling cellular telephone systems to predict signal strength for cells within buildings under real conditions, by considering the effects of the inter-building and intra-building structures on the transmitted signals.

One object of the present invention is to solve the above-described problems by using models of the buildings to more accurately predict the conditions that the cellular telephone system will be used under. Another object of the present invention is to increase capacity of the cellular telephone system. It is a further object of the present invention to more accurately model a cellular telephone system. It is a further object of the present invention to reduce the costs of implementing a cellular telephone system.

For a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

The present invention provides methods for accurately determining the signal strength for transmitters and receivers that are within buildings. The method includes using typical line of sight calculations, as well as determining the inter-building and intra-building effects on the signal strength calculation.

The features of buildings of modern construction that influence propagation between transmitter and receiver either inside the same building (intra-building) or from within the building to outside of the building (inter-building) affect the signal strength of the transmitted and received signals. Even on the same floor of a building, the signal between transmitter and receiver can be altered by items and people within the building.

One feature is the clear space between ceiling and furniture or floor that results in excess attenuation of signal. A second feature is the reflection and transmission qualities at interior and exterior walls of the building. Yet another feature is to provide different propagation formula for the different types of rooms within a building. The present invention identifies these components and uses them to predict the signal strength for an in-building microcell of a cellular telephone system.

The resulting multipath structure causes the received signal to exhibit strong variations as either the transmitter or receiver antenna is moved over a distance on the order of $\lambda/2$, where $\lambda$ is the wavelength of the transmitted signal. For propagation inside buildings, it is impossible to account for every interaction as a radio signal propagates through the building, or to model the signal variation on a wavelength scale.

Traditional practice has been to average the signal by moving the transmitter antenna or the receiver antenna over a spatial area having linear dimensions of 10 to 20 wavelengths (often in a circular path) to remove the rapid variation. The result has been referred to as the sector average.

By considering the actual path that the signal takes between transmitter antenna and receiver antenna, including inter-building and intra-building effects, systems designers can construct a more accurate model of the conditions that the system must operate under. This enhanced modeling technique make cellular telephone systems easier to design and cheaper to place in the field.

Hardware Environment

Figure 1:
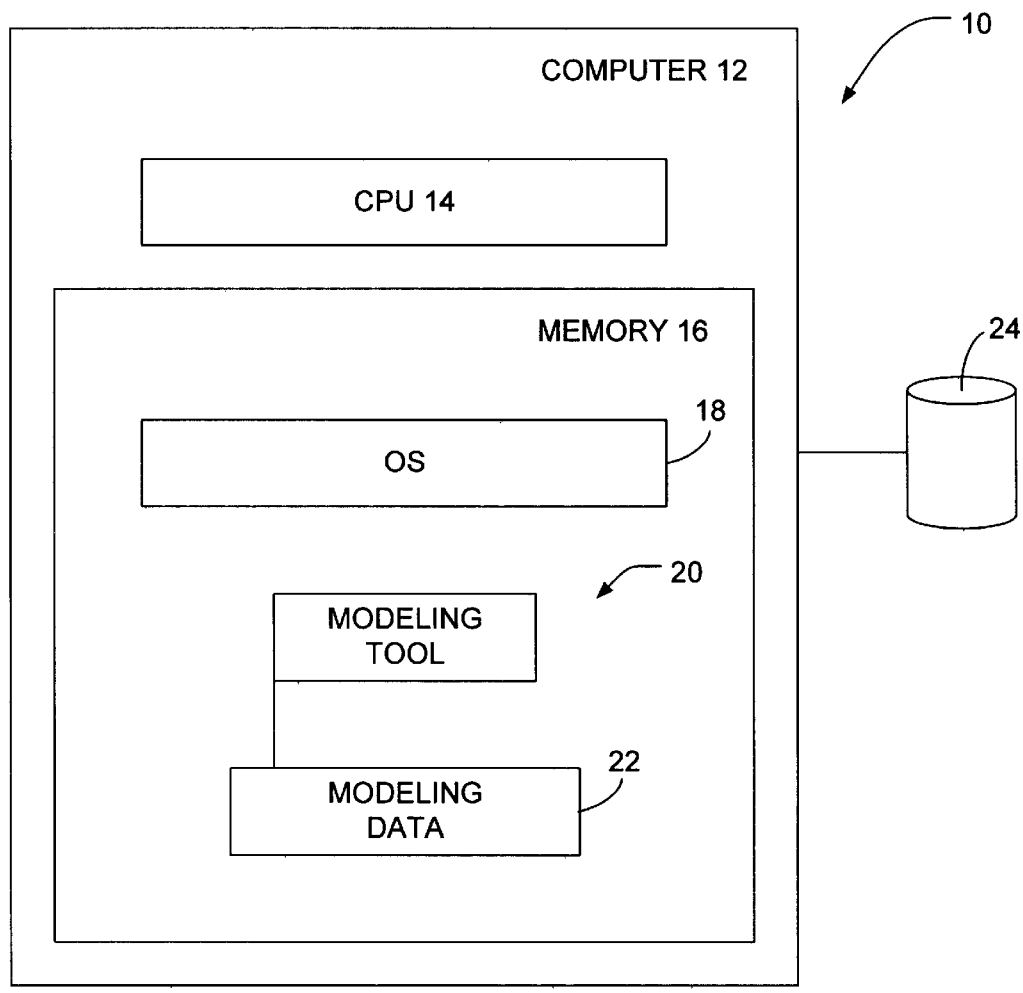
FIG. 1 illustrates an exemplary computer system 10 that could be used to implement the present invention.

FIG. 1 illustrates an exemplary computer system 10 that could be used to implement the present invention. The computer 12 comprises a processor 14 and random access memory (RAM) 16. The computer 12 may be coupled to other devices, such as a monitor, a keyboard, a mouse device, a printer, etc. Of course, those skilled in the art will recognize that any combination of the above components, or any number of different components, peripherals, and other devices, may be used with the computer 12.

Generally, the computer 12 operates under control of an operating system 18. The present invention is preferably implemented using one or more computer programs 20 and data structures 22 operating under the control of the operating system 18. More specifically, the present invention comprises a modeling tool 20 and modeling data 22 that model a cellular telephone system, including the signal strength at points within a specified volume of space of the system, given certain constrictions and conditions within that space. The modeling tool 20 outputs the results of these operations as characters, text, and graphics on a monitor, printer, or other device attached to the computer 12.

In the preferred embodiment, the operating system 18, the modeling tool 20, and the modeling data 22 are tangibly embodied in a computer-readable medium, e.g., data storage device 24, which could include one or more fixed or removable data storage devices, such as a removable cartridge drive, floppy disc drive, hard drive, CD-ROM drive, tape drive, etc. Further, the operating system 18 and the modeling tool 20 are comprised of instructions which, when read and executed by the computer 12, causes the computer 12 to perform the steps necessary to implement and/or use the present invention. Of course, those skilled in the art will recognize many modifications may be made to this configuration without departing from the scope of the present invention.

Microcells

Figure 2:
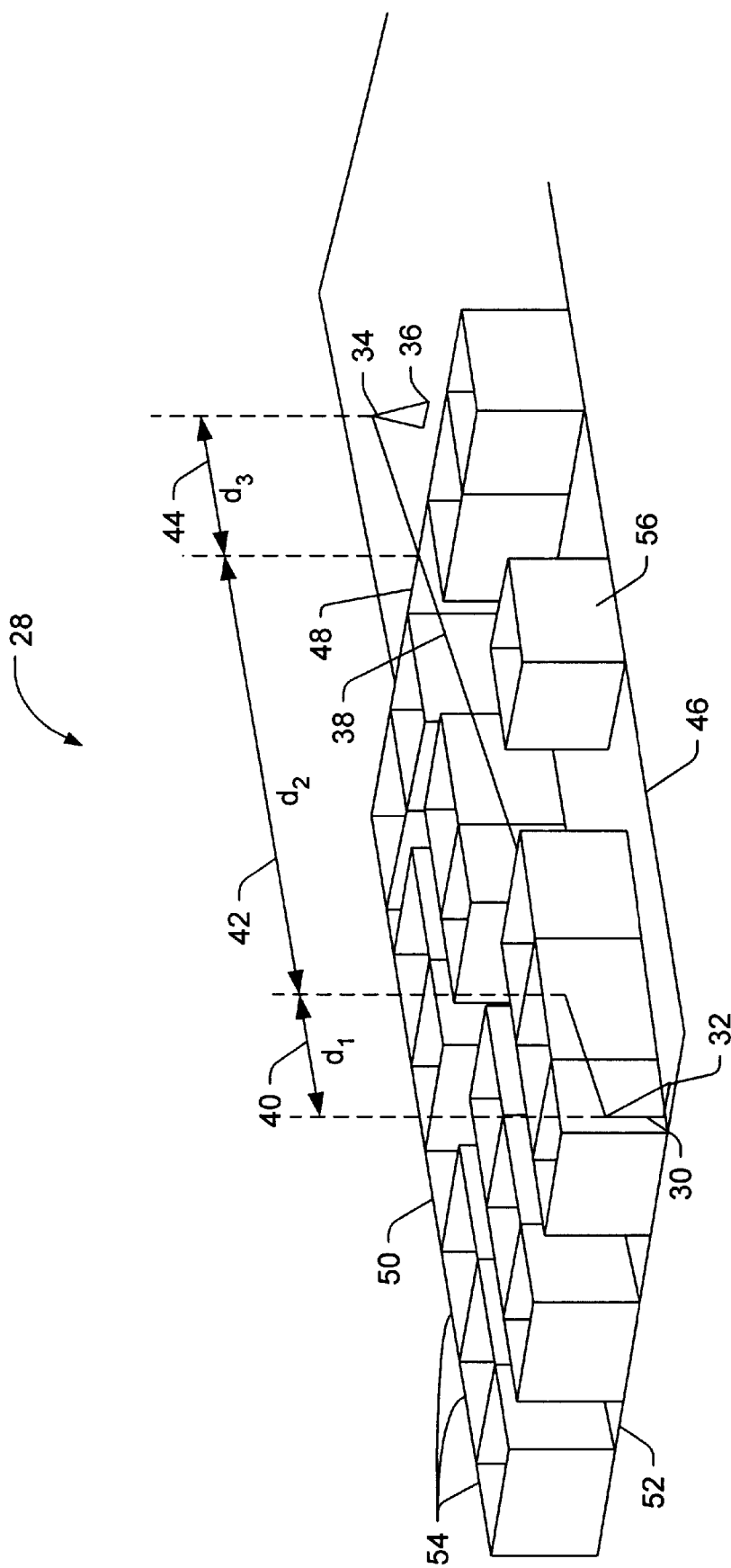
FIG. 2 is a diagram that illustrates a microcell (or other cell) of a cellular telephone system contained within a building.

FIG. 2 is a diagram that illustrates a microcell (or other cell) of a cellular telephone system contained within a building 28. Only a single floor is represented in the illustration, although those skilled in the art understand that the present invention will work for more than one floor.

A transmitter antenna 30 is located at position 32 within the building 28, although those skilled in the art will recognize that position 32 could be outside the building 28. A receiver antenna 34 is located at position 36 outside the building 28, although those skilled in the art will recognize that position 36 could be within building 28.

A line of sight path 38 is shown between transmitter antenna 30 and receiver antenna 34. The path 38 has three components: segment $d_1$ 40, segment $d_2$ 42, and segment $d_3$ 44.

Information is gathered on the building 28 layout to determine the lengths of segments $d_1$ 40, $d_2$ 42, and $d_3$ 44. The building 28 layout information includes the boundaries 46, 48, 50, and 52 of the building 28, the size, shape, and location of standard rooms 54 within the building 28, and the size, shape and location of any special rooms 56 within the building 28. Special rooms 56 include elevators, utility rooms, rooms with special wall construction such as safes or secure rooms, or other rooms that require different loss calculations from standard rooms 54.

Path 38 losses are then computed by segment. The losses due to segment $d_1$ 40 are calculated first. If segment $d_2$ 42 exists for a given path 38, then the losses due to segment $d_2$ 42 are calculated. Finally, any losses due to segment $d_3$ 44 are calculated.

Segment $d_1$ 40 is the distance from transmitter antenna 30 to a first room, segment $d_2$ 42 is the distance from the first room intersection to boundary 48, and segment $d_3$ 44 is the distance from boundary 48 to the receiver antenna 34. Any of the segments 40, 42, or 44 can be zero length for a given signal strength calculation.

Figure 3:
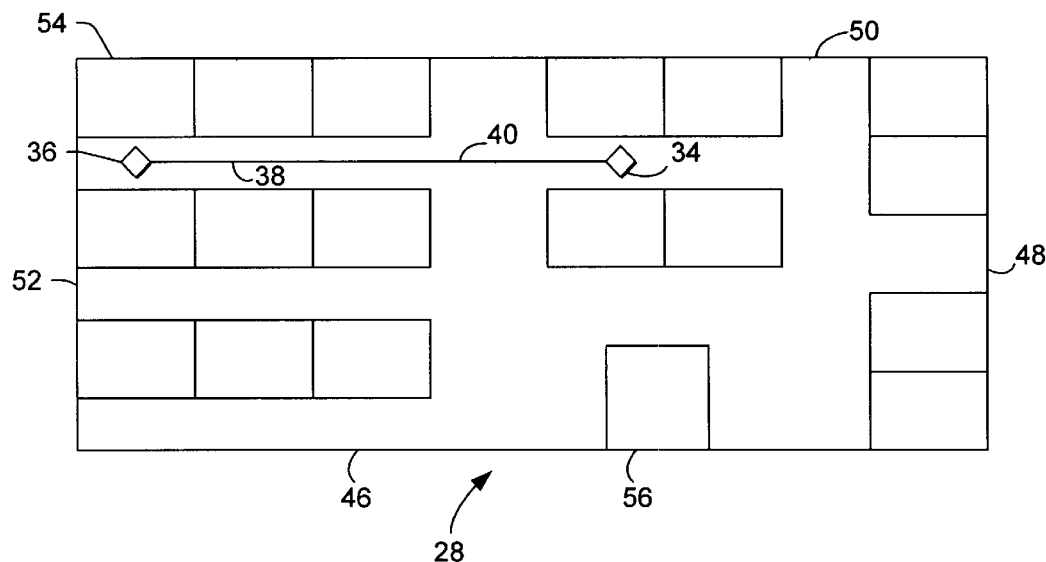
FIG. 3 is a simplified diagram providing a top view of the building layout shown in FIG. 2.

FIG. 3 is a simplified diagram providing a top view of the building 28 layout shown in FIG. 2. In this diagram, the transmitter antenna 30 and receiver antenna 34 are placed on a path 38 that has no obstructions. This is called a direct line of sight path 38. In this case, the path 38 consists only of segment $d_1$ 40, and segments $d_2$ 42 and $d_3$ 44 are zero.

The line of sight losses ($L_{los}$) for segment $d_1$ 40 is given by:

$$L_{los} = \frac{4\pi d_1}{\lambda}$$

where:

$\lambda$=the wavelength of the transmitted signal, and $d_1$ =the length of segment $d_1$ 40.

If $P_t$ is the power transmitted from the transmitter antenna 30, the total power $P_r$ at the receiver antenna 34 is given by:

$$P_r = P_t + G_t - L_{los} + G_r$$

where:

$G_t$=gain of transmitter antenna 30, and $G_r$=gain of receiver antenna 34.

Figure 4:
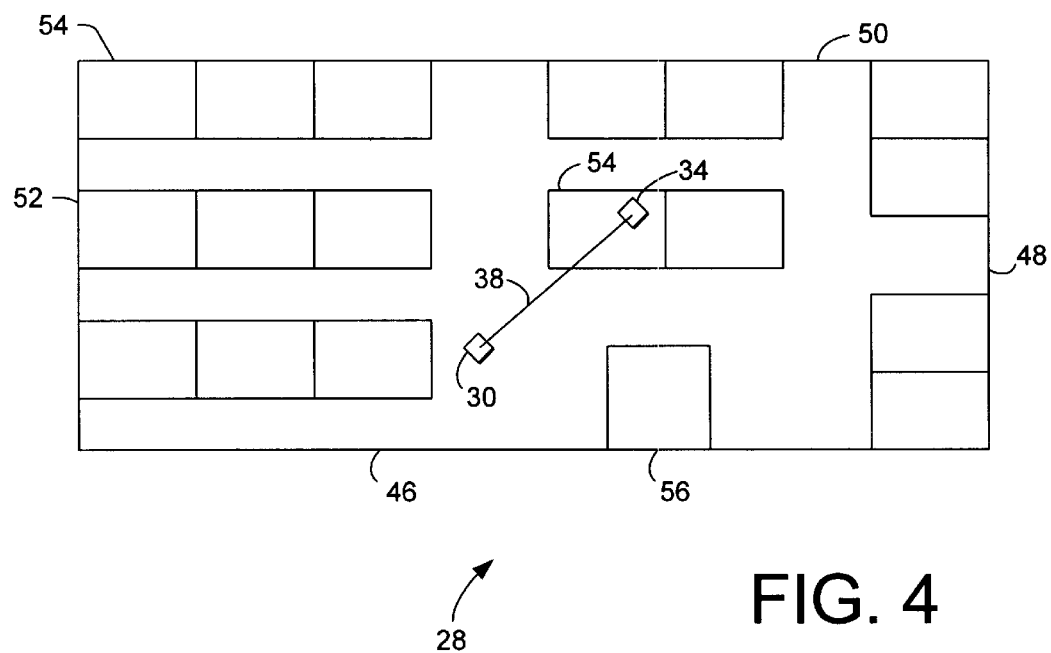
FIG. 4 is a simplified diagram providing a top view of the building layout shown in FIG. 2.

FIG. 4 is a simplified diagram providing a top view of the building 28 layout shown in FIG. 2. As shown, the transmitter antenna 30 and receiver antenna 34 can be moved around the building 28, and can sometimes be positioned within standard rooms 54 or special rooms 56 of the building 28. Further, the transmitter antenna 30 and receiver antenna 34 can be very close to each other, which means that the antenna patterns of transmitter antenna 30 and receiver antenna 34 interfere. The area within which this interference takes place is called the Fresnel zone. In this diagram, the transmitter antenna 30 and receiver antenna 34 are placed on a path 38 that includes obstructions, where the receiver antenna 34 is within the Fresnel zone of the transmitter antenna 30, as well as the transmitted signal being obstructed by a room 54.

When the receiver antenna 34 is within the Fresnel zone of the transmitter antenna 30, the path 38 losses are calculated by:

$$L_{los} = \frac{4\pi d}{\lambda}$$

where:

$L_{los}$=path 38 losses between transmitter antenna 30 and receiver antenna 34, and d=length of path 38.

The power of the received signal at receiver antenna 34 is then given by:

$$P_r = P_t + G_t - L_{los} + G_r$$

Figure 5:
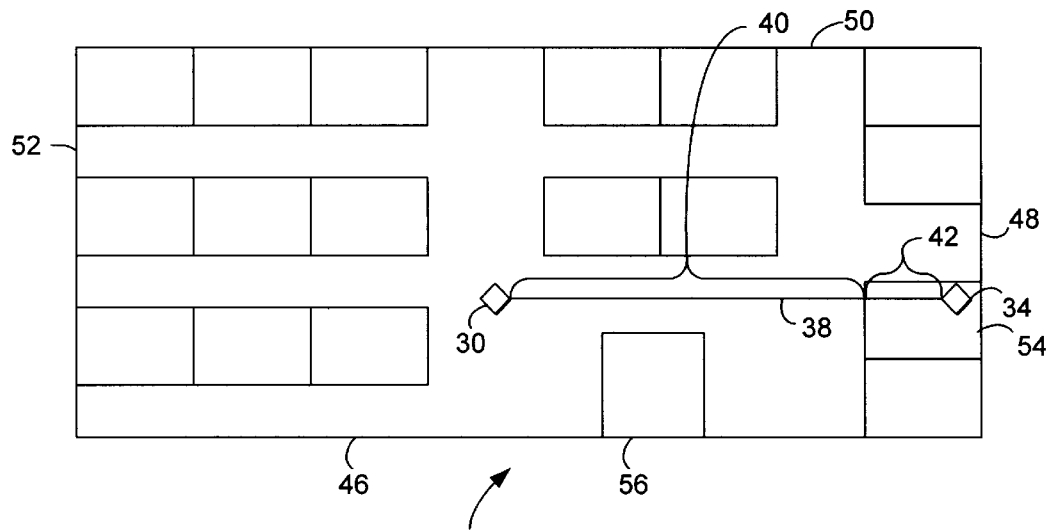
FIG. 5 is another simplified diagram providing a top view of the building layout shown in FIG. 2.

FIG. 5 is another simplified diagram providing a top view of the building 28 layout as shown in FIG. 2. In this diagram, the transmitter antenna 30 and receiver antenna 34 are placed on a path 38 that includes obstructions, where the receiver antenna 34 is outside the Fresnel zone of the transmitter antenna 30, and the transmitted signal is obstructed by a standard room 54. In this situation, the path 38 losses are calculated using two components.

Segment $d_1$ 40 is the direct line of sight path from the transmitter antenna 30 to the standard room 54 wall intersection, and the path loss $L_{los}$ is calculated as described with respect to FIG. 4:

$$L_{los} = \frac{4\pi d_1}{\lambda}$$

Segment $d_2$ 42 is the distance from the standard room 54 wall intersection to the receiver antenna 34 along the segment d2 42. The loss $L_{room}$ due to segment d2 42 is calculated as:

$$L_{room} = m_{room} \log d_2$$

where:

$m_{room}$=the slope of the standard room 54, and $d_2$ =the length of segment $d_2$ 42.

The room 54 slope is typically 40, but can be other values, as measured or empirically determined. Once a room 54 slope has been measured, this value is substituted into the calculation to determine $L_{room}$.

$L_{room}$ can vary for standard rooms 54 and special rooms 56. The room slopes can also be averaged for standard rooms 54 and special rooms 56, depending on the building 28 design.

The power ($P_r$) received from the transmitter antenna 30 at the receiver antenna 34 is given by:

$$P_r = P_t + G_t - L_{los} - L_{room} + G_r$$

If the receiver antenna 34 is in a special room 56, then the path losses due to segment $d_2$ 42 is given by:

$$L_{SpecialRoom} = m_{SpecialRoom} \log d_2$$

where:

$L_{SpecialRoom}$=the losses due to segment $d_2$ 42, and $m_{SpecialRoom}$=the slope of the special room.

The value of the slope for the special room 56, $m_{SpecialRoom}$, can be the same as a standard room 54 within the building 28, or can be different than a standard room 54.

The power ($P_r$) received from the transmitter antenna 30 at the receiver antenna 34, if the receiver antenna 34 is in a special room 56 is given by:

$$P_r = P_t + G_t - L_{los} - L_{SpecialRoom} + G_r$$

Figure 6:
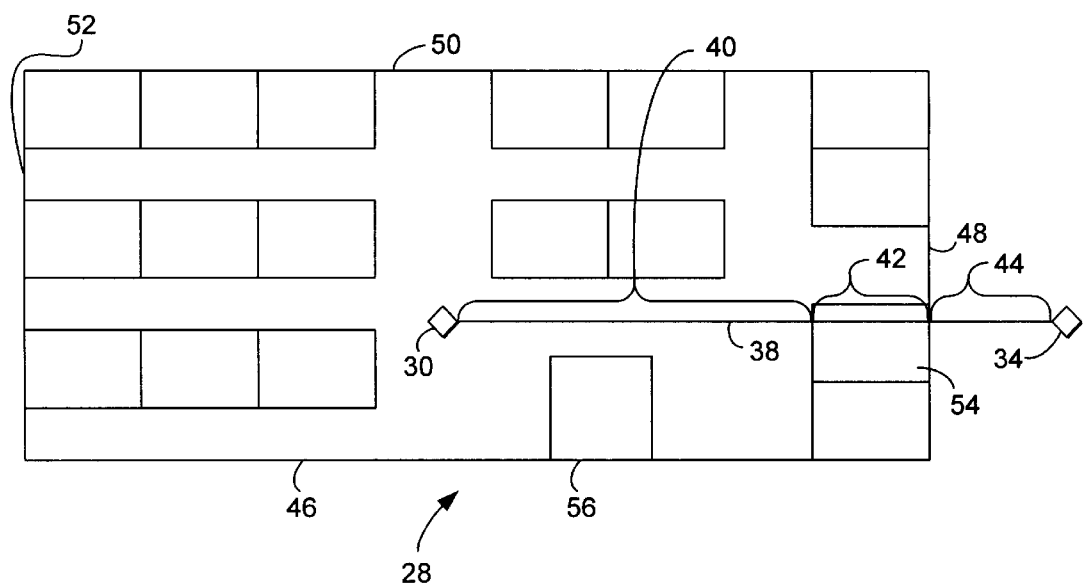
FIG. 6 is another simplified diagram providing a top view of the building layout shown in FIG. 2.

FIG. 6 is another simplified diagram providing a top view of the building 28 layout shown in FIG. 2. In this diagram, the transmitter antenna 30 is inside the building 28 and the receiver antenna 34 is outside the building 28. The path losses now are comprised of three components: a loss due to segment $d_1$ 40, a loss due to segment $d_2$ 42, and a loss due to segment $d_3$ 44.

As discussed with respect to FIG. 5, segment $d_1$ 40 would contribute a path loss of $L_{los}$, and segment $d_2$ 42 would contribute a path loss of $L_{room}$. However, for a receiver antenna 34 that is positioned outside the building 28, an additional path loss, $L_{outside}$, is introduced by the existence of segment $d_3$ 44. Loutside can vary depending on the construction of the wall of the building 28, and can also vary depending on which wall 46, 48, 50, or 52 the path travels through.

The path loss contributed by segment $d_1$ 40 is given by:

$$L_{los} = \frac{4\pi d_1}{\lambda}$$

The path loss contributed by segment $d_2$ 42 is given by:

$$L_{room} = m_{room} \log d_2$$

The path loss contributed by segment $d_3$ 44 is given by:

$$L_{outside} = \Delta + 20 \log d_3$$

where $\Delta$ is an additional space loss, typically 20 dB.

The power at the receiver antenna 34, $P_r$, is then given by:

$$P_r = P_t + G_t - L_{los} - L_{room} - L_{outside} + G_r$$

Logic of the Modeling Tool

Figure 7:
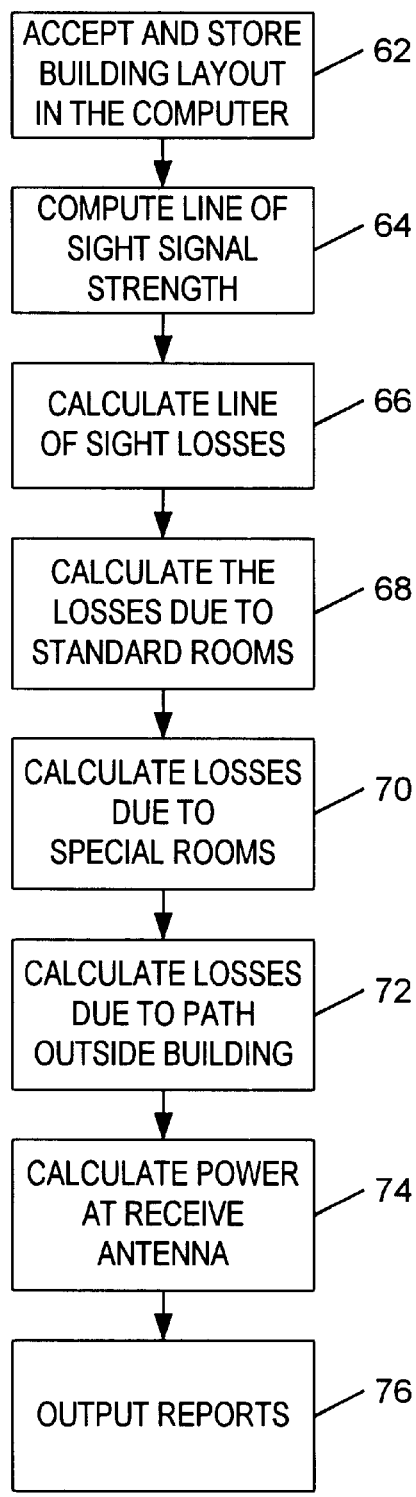
FIG. 7 is a flow chart illustrating the logic performed by the modeling tool according to the present invention.

FIG. 7 is a flow chart illustrating the logic performed by the modeling tool 20 according to the present invention.

Block 62 represents the computer 12 accepting and storing modeling data 22 in its memory 16, wherein the modeling data 22 includes the various measured values of the cellular telephone system, which are necessary to perform the computations indicated below.

Blocks 64–74 represent the computer 12 computing a strength of a signal received at the receiver antenna from the transmitter antenna using the stored data. The strength of the signal is computed by determining a line of sight signal strength between the transmitter antenna and the receiver antenna, determining effects on the signal strength from one or more obstructions between the transmitter antenna and the receiver antenna, and modifying the line of sight signal strength using the determined effects. These steps are described in more detail below.

Block 66 represents the computer 12 calculating line of sight losses ($L_{los}$) for each segment $d_i$:

$$L_{los} = \frac{4\pi d_i}{\lambda}$$

where:

$L_{los}$=line of sight loss, $\lambda$=the wavelength of the transmitted signal, and $d_i$=the length of segment i. Block 66 also represents the computer 12 accumulating the loss $L_{los}$ for all segments i in $L_{los}$.

If any segment i intersects a standard room, then Block 68 represents the computer 12 calculating the loss $L_{room}$:

$$L_{room} = m_{room} \log d_i$$

where:

$L_{room}$=standard room loss (initialized to 0), $m_{room}$=the slope of the room, and $d_i$=the length of segment i.

Block 68 also represents the computer 12 accumulating the loss $L_{room}$ for all segments i in $L_{room}$.

If any segment i intersects a special room, then Block 70 represents the computer 12 calculating the loss $L_{Specialroom}$:

$$L_{SpecialRoom} = m_{SpecialRoom} \log d_i$$

where:

$L_{SpecialRoom}$=special room loss (initialized to 0), $m_{SpecialRoom}$=the slope of the special room, and $d_i$=length of the segment i.

Block 70 also represents the computer 12 accumulating the loss $L_{SpecialRoom}$ for all segments i in $L_{SpecialRoom}$.

If any segment i is outside the building, then Block 72 represents the computer 12 calculating the calculating the loss $L_{outside}$:

$$L_{outside} = \Delta + 20 \log d_i$$

where:

$L_{outside}$=outside loss (initialized to 0), $d_i$=length of the segment I, and $\Delta$=additional loss, normally $\Delta$=20.

Block 72 also represents the computer 12 accumulating the loss $L_{outside}$ for all segments i in $L_{outside}$.

Finally, Block 74 represents the computer 12 calculating the power at the receiver antenna:

$$P_r = P_t + G_t - L_{los} - L_{room} - L_{outside} + G_r$$

where:

$P_r$=power at receiver antenna, $P_t$=power at transmitter antenna, $G_t$=gain of transmitter antenna, and $G_r$=gain of receiver antenna.

The values $P_r$, $P_t$, $G_t$, and $G_r$ are all directly measurable quantities of the cellular telephone system that are entered into the computer 12 and stored as the modeling data 22. The remaining values $L_{los}$, $L_{room}$, and $L_{outside}$ are computed, as indicated in Blocks 64–74, from directly measurable values of the cellular telephone system that are entered into the computer 12 and stored as the modeling data 22.

Figure 9:
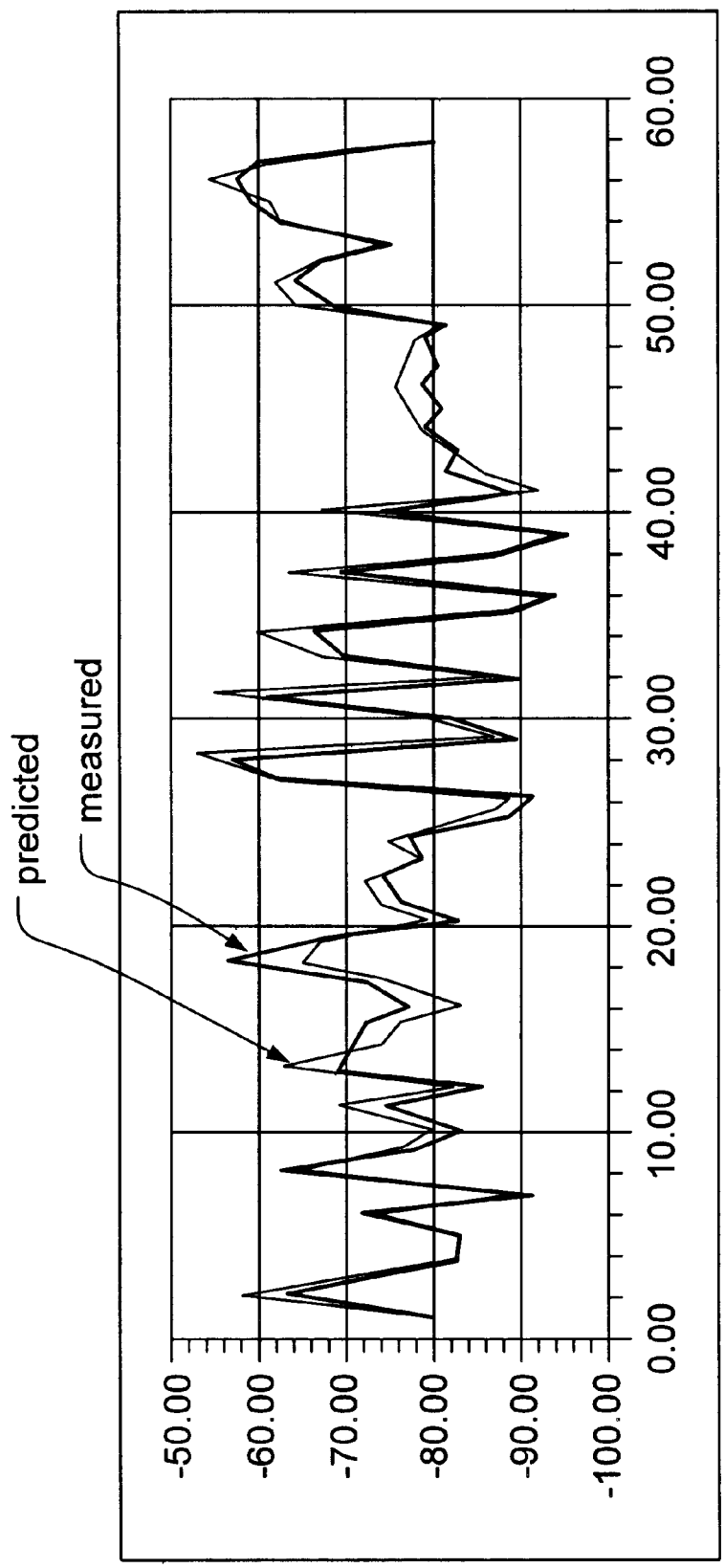
FIG. 9 is a graph of the predicted signal strength versus the measured signal strength using the present invention.

Finally, block 76 represents the computer 12 outputting one or more reports as represented in FIG. 9. These reports are then used in the practical application of constructing cells for a cellular telephone system, or for optimizing cells already present in a cellular telephone system.

Output of the Modeling Tool

Figure 8:
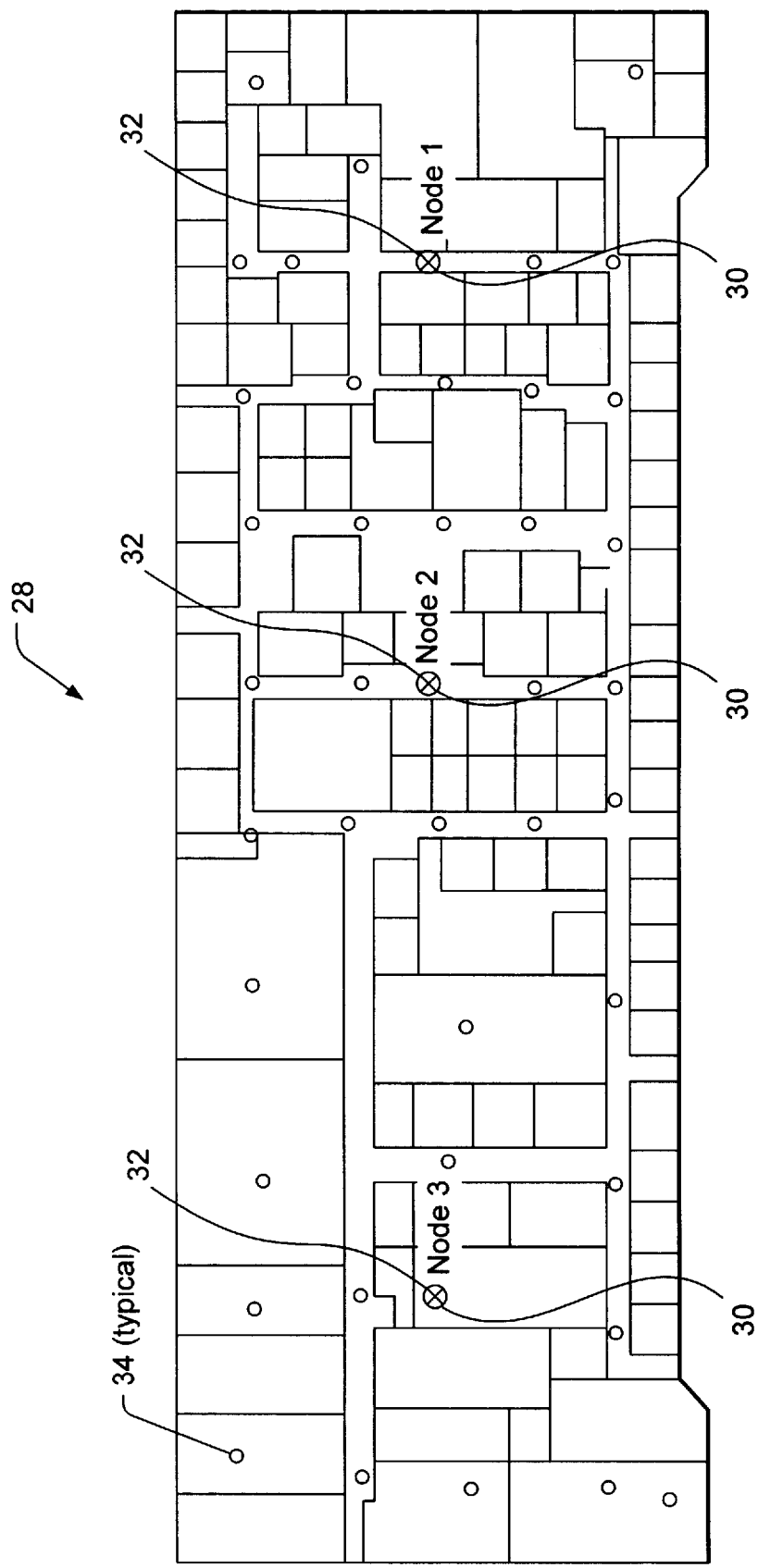
FIG. 8 is a diagram that illustrates a microcell of a cellular telephone system that was measured and then modeled using the present invention.

FIG. 8 is a diagram that illustrates a microcell of a cellular telephone system that was measured and then modeled using the present invention. In this measurement, a transmitter antenna 30 was first placed at one position 32 (node 1), and measurements were made of the signal strength at the receiver antenna 34, at various locations in various rooms as shown by the dots on FIG. 8. Transmitter antenna 30 was then placed at a different position 32 (node 2) and measurements were again made of the signal strength at the receiver antenna 34 at various locations in various rooms as shown by the dots in FIG. 8. Transmitter antenna 30 was finally placed at a third position 32 (node 3) and again measurements were made of the signal strength at receiver antenna 34 at various locations in various rooms 54. The three positions 32 (node1, node2, and node3) were chosen to test some special cases for the transmitter antenna 30, such as transmitting through line of sight conditions, non-line of sight conditions, Fresnel zone conditions, through standard rooms, and through special rooms.

FIG. 9 is a graph of the predicted signal strength versus the measured signal strength using the present invention. The graph shows the differences between the predicted signal strength for the three positions 32 used in FIG. 8, and the measured signal strength for the three positions 32 as a function of distance from the transmitter antenna 30. The slopes of the standard rooms 54 and special rooms 56 were derived and applied to the building 28 layout to arrive at the predicted values. The mean delta between the predicted and measured values was 2.13 dB and more than 85 percent of the predicted values were within a delta of 4 dB.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited with this detailed description.

What is claimed is:

1. A computer-implemented method for modeling a wireless commnunications system comprising a transmitter having an antenna and a receiver having an antenna located at a distant location from the transmitter antenna, comprising the steps of:

(a) collecting data concerning the operation of the transmitter and receiver, and storing the collected data in a computer, (b) computing a strength of a signal received at the receiver antenna from the transmitter antenna using the stored data, wherein the strength of the signal is computed by determining a line of sight signal strength between the transmitter antenna and the receiver antenna, by detining effects on the signal strength from one or more inter-building and intra-building structures between the transmitter antenna and the receiver antenna, and by modifying the line of sight signal strength using the determined effects; and (c) outputting one or more reports from the computer representing the modified line of sight signal strength, wherein the reports are used in operating the wireless communications system.

2. The method of claim 1, wherein the computing step further comprises the step of computing a strength $P_r$ of a signal received at the receiver antenna from the transmitter antenna using the stored data, wherein the strength $P_r$ is computed as:

$$P_r = P_t + G_t - L_{los} - L_{room} - L_{outside} + G_r$$

where:

$P_r$ is a signal strength at the receiver antenna, $P_t$ is a transmitter power, $G_t$ is a transmitter antenna gain, $L_{los}$ is a loss under line of sight, $L_{room}$ is a loss due to intra-building effects, $L_{outside}$ is a loss due to inter-building effects, and $G_r$ is a receiver antenna gain.

3. The method of claim 2, wherein the computing step further comprises the steps of:

(1) calculating a line of sight loss $L_{los}$ for each segment $d_i$:

$$L_{los} = \frac{4\pi d_i}{\lambda}$$

where n is a number of segments, $\lambda$ is a wavelength of a transmitted signal, and $d_i$ is a length of segment I; and (2) accumulating the line of sight loss $L_{los}$ for all segments $d_i$ as $L_{los}$.

4. The method of claim 2, wherein the computing step further comprises the steps of:

(1) calculating a standard room loss $L_{room}$ of each segment i that intersects a standard room as:

$$L_{room} = m_{room} \log d_i$$

where $m_{room}$ is a slope of the standard room, and $d_i$ is a length of segment i; and (2) accumulating the standard room loss $L_{room}$ for all segments $d_i$ as $L_{room}$.

5. The method of claim 2, wherein the computing step further comprises the steps of:

(1) calculating a special room loss $L_{specialroom}$ of each segment i that intersects a special room as:

$$L_{SpecialRoom} = m_{SpecialRoom} \log d_i$$

where: $m_{SpecialRoom}$ is a slope of the special room, and $d_i$ is a length of the segment I; and (2) accumulating the special room loss $L_{SpecialRoom}$ for all segments $d_i$ as $L_{SpecialRoom}$.

6. The method of claim 2, wherein the computing step further comprises the steps of:

(1) calculating an outside loss $L_{outside}$ of each segment i that is outside the building as:

$$L_{outside} = \Delta + 20 \log d_i$$

where $d_i$ is a length of the segment i, and $\Delta$ is an additional loss; and (2) accumulating the outside loss $L_{outside}$ for all segments $d_i$ as $L_{outside}$.

7. An article of manufacture comprising a program storage medium readable by a computer having a memory, the medium tangibly embodying one or more programs of instructions executable by the computer to perform method steps for synchronizing elements of an object-oriented system, the method comprising the steps of:

(a) collecting data concerning the operation of the transmitter and receiver, and storing the collected data in a computer;

(b) computing a strength of a signal received at the receiver antenna from the transmitter antenna using the stored data, wherein the strength of the signal is computed by determining a line of sight signal strength between the transmitter antenna and the receiver antenna, by determining effects on the signal strength from one or more inter-building and intra-building structures between the transmitter antenna and the receiver antenna, and by modifying the line of sight signal strength using the determined effects; and (c) outputting one or more reports from the computer representing the modified line of sight signal strength, wherein the reports are used in operating the wireless communications system.

8. A computerized apparatus for synchronizing elements of an object oriented system, comprising:

(a) a computer having a memory;

(b) means, performed by the computer, for collecting data concerning the operation of the transmitter and receiver, and storing the collected data in a computer;

(c) means, performed by the computer, for computing a strength of a signal received at the receiver antenna from the transmitter antenna using the stored data, wherein the strength of the signal is computed by determining a line of sight signal strength between the transmitter antenna and the receiver antenna, by determining effects on the signal strength from one or more inter-building and intra-building structures between the transmitter antenna and the receiver antenna, and by modifying the line of sight signal strength using the determined effects; and (d) means, performed by the computer, for outputting one or more reports from the computer representing the modified line of sight signal strength, wherein the reports are used in operating the wireless communications system.

9. The article of manufacture of claim 7, wherein the computing step further comprises the step of computing a strength $P_r$ of a signal received at the receiver antenna from the transmitter antenna using the stored data, wherein the strength $P_r$ is computed as:

$$P_r = P_t + G_t - L_{los} - L_{room} - L_{outside} + G_r$$

where:

$P_r$ is a signal strength at the receiver antenna, $P_t$ is a transmitter power, $G_t$ is a transmitter antenna gain, $L_{los}$ is a loss under line of sight, $L_{room}$ is a loss due to intra-building effects, $L_{outside}$ is a loss due to inter-building effects, and $G_r$ is a receiver antenna gain.

10. The article of manufacture of claim 9, wherein the computing step furter comprises the steps of:

(1) calculating a line of sight loss $L_{los}$ for each segment $d_i$:

$$L_{los} = \frac{4\pi d_i}{\lambda}$$

where n is a number of segments, $\lambda$ is a wavelength of a transmitted signal, and $d_i$ is a length of segment I; and (2) accumulating the line of sight loss $L_{los}$ for all segments $d_i$ as $L_{los}$.

11. The article of manufacture of claim 9, wherein the computing step further comprises the steps of:

(1) calculating a standard room loss $L_{room}$ of each segment i that intersects a standard room as:

$$L_{room} = m_{room} \log d_i$$

where $m_{room}$ is a slope of the standard room, and $d_i$ is a length of segment i; and (2) accumulating the standard room loss $L_{room}$ for all segments $d_i$ as $L_{room}$.

12. The article of manufacture of claim 9, wherein the computing step further comprises the steps of:

(1) calculating a special room loss $L_{specialroom}$ of each segment i that intersects a special room as:

$$L_{SpecialRoom} = m_{SpecialRoom} \log d_i$$

where $m_{SpecialRoom}$ is a slope of the special room, and $d_i$ is a length of the segment I; and (2) accumulating the special room loss $L_{SpecialRoom}$ for all segments $d_i$ as $L_{SpecialRoom}$.

13. The article of manufacture of claim 9, wherein the computing step further comprises the steps of:

(1) calculating an outside loss $L_{outside}$ of each segment i that is outside the building as:

$$L_{outside} = 20 + 20 \log d_i$$

where $d_i$ is a length of the segment i; and (2) accumulating the outside loss $L_{outside}$ for all segments $d_i$ as $L_{outside}$.

14. The apparatus of claim 8, wherein the means for computing further comprises means for computing a strength $P_r$ of a signal received at the receiver antenna from the transmitter antenna using the stored data, wherein the strength $P_r$ is computed as:

$$P_r = P_t + G_t - L_{los} - L_{room} - L_{outside} + G_r$$

where:

$P_r$ is a signal strength at the receiver antenna, $P_t$ is a transmitter power, $G_t$ is a transmitter antenna gain, $L_{los}$ is a loss under line of sight, $L_{room}$ is a loss due to intra-building effects, $L_{outside}$ is a loss due to inter-building effects, and $G_r$ is a receiver antenna gain.

15. The apparatus of claim 14, wherein the means for computing further comprises:

(1) means for calculating a line of sight loss $L_{los}$ for each segment $d_i$:

$$L_{los} = \frac{4\pi d_i}{\lambda}$$

where n is a number of segments, $\lambda$ is a wavelength of a transmitted signal, and $d_i$ is a length of segment I; and (2) means for accumulating the line of sight loss $L_{los}$ for all segments $d_i$ as $L_{los}$.

16. The apparatus of claim 14, wherein the means for computing further comprises:

(1) means for calculating a standard room loss $L_{room}$ of each segment i that intersects a standard room as:

$$L_{room} = m_{room} \log d_i$$

where $m_{room}$ is a slope of the standard room, and $d_i$ is a length of segment i; and (2) means for accumulating the standard room loss $L_{room}$ for all segments $d_i$ as $L_{room}$.

17. The apparatus of claim 14, wherein the means for computing further comprises:

(1) means for calculating a special room loss $L_{specialroom}$ of each segment i that intersects a special room as:

$$L_{SpecialRoom} = m_{SpecialRoom} \log d_i$$

where $m_{SpecialRoom}$ is a slope of the special room, and $d_i$ is a length of the segment I; and (2) means for accumulating the special room loss $L_{SpecialRoom}$ for all segments $d_i$ as $L_{SpecialRoom}$.

18. The apparatus of claim 14, wherein the means for computing further comprises:

(1) means for calculating an outside loss $L_{outside}$ of each segment i that is outside the building as:

$$L_{outside} = 20 + 20 \log d_i$$

where $d_i$ is a length of the segment i; and (2) means for accumulating the outside loss $L_{outside}$ for all segments $d_i$ as $L_{outside}$.

* * * * *

UNITED STATES PATENT AND TRADEMARK OFFICE
CERTIFICATE OF CORRECTION

PATENT NO. : 6,088,552
DATED : July 11, 2000
INVENTOR(S) : William Chien-Yeh Lee and Jau Young Lee It is certified that error appears in the above-identified patent and that said Letters Patent is hereby corrected as shown below:

Column 6,
Line 35, "Loutside" should read -- $L_{outside}$ --.

Column 7,
Line 17, after "segment i." insert a new paragraph;
Line 44, strike second occurrence of "calculating the".

Column 8,
Line 66, "detining" should read -- determining --.

Signed and Sealed this

Fourth Day of June, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

| | |
|---|---|
| PATENT NO. | : 6,088,522 |
| DATED | : July 11, 2000 |
| INVENTOR(S) | : William Chien-Yeh Lee and Jau Young Lee |

It is certified that error appears in the above-identified patent and that said Letters Patent is hereby corrected as shown below:

Column 6,
Line 35, "Loutside" should read -- $L_{outside}$ --.

Column 7,
Line 17, after "segment i." insert a new paragraph;
Line 44, strike second occurrence of "calculating the".

Column 8,
Line 66, "detining" should read -- determining --.

Signed and Sealed this

Sixteenth Day of July, 2002

Attest:

JAMES E. ROGAN
Attesting Officer    Director of the United States Patent and Trademark Office